Patented Sept. 9, 1930

1,775,366

UNITED STATES PATENT OFFICE

ALFRED JOSEPH, OF ENGHEIN, FRANCE, ASSIGNOR TO COMPAGNIE INTERNATIONALE POUR LA FABRICATION DES ESSENCES ET PETROLES, OF PARIS, FRANCE, A LIMITED JOINT-STOCK COMPANY OF FRANCE

COMPOSITION FOR THE PURIFICATION OF GASES

No Drawing. Application filed March 1, 1929, Serial No. 343,849, and in France April 13, 1928.

This invention relates to compositions for the purification of gases derived from the distillation or from the heat treatment of solid, pasty or liquid carbonaceous materials.

Usually for the purification of gases derived from the distillation or from the heat treatment of solid, pasty or liquid carbonaceous materials, metallic agents such as nickel or another metal (copper, cobalt ...) or oxides of these metals are employed, deposited on a carrier of inert material such as kaolin, clay, pumice stone, kieselguhr, infusorial earth, etc. The metal of such compositions retains the sulphur so that the purifying mass, wherein the metal is converted into a sulphide, must be periodically regenerated by converting the sulphide into a metal or oxide, such conversion being effected with the aid of a stream of air or oxygen which eliminates the sulphur in the form of sulphurous anhydride.

Now, in order that the regenerated metal can act in an effective manner as a purifying agent capable of retaining in a relatively reduced volume, the sulphur of the gases treated, it is imperative that it remain, in the purifying mass, in the active state. It is therefore necessary that the heat liberated by an exothermic reaction such as:

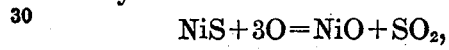

$$NiS + 3O = NiO + SO_2,$$

which occurs on regeneration by a stream of air or oxygen, be insufficient to heat the mass to a temperature capable of appreciably reducing the activity of the metal. With nickel, for example, the applicant has found that such temperature must not exceed approximately 800° C., notwithstanding that fusion of the metal does not commence until in the neighborhood of 1452° C.

In order to prevent such heating of the mass beyond the temperature limit of 800° C., the applicant has already proposed the employment of receivers of annular form providing a suitable cooling surface. The applicant has moreover proposed to dilute the stream of regenerating air by means of inert gas such gas being preferably constituted by the nitrogen from the regenerating air the oxygen of which has become fixed on the sulphur of the purifying mass.

The applicant has found that an excessive heating of the purifying mass undergoing regeneration can be effectively guarded against, without necessarily having recourse to the above mentioned artifices, by proportioning in a suitable manner the quantities of the metal and of the inert carrier material.

The applicant has found that in order to avoid an increase of the temperature to beyond the desired limit, it is necessary to proportion, in the purifying mass, the weights of metal and of inert material so that the entire composition cannot retain a weight of sulphur more than 10% of the weight of the said mass.

With nickel used as the purifying agent proper, if such metal is employed by deposition on a carrier such as clay, by immersion of the latter in a salt such as nickel nitrate, and by subsequent decomposition of the salt for eliminating the acid, it is necessary that the weight of nickel thus deposited be in all cases less than 20% of the weight of the purifying mass (nickel+carrier).

It is obvious that the weight of nickel or other metal that the mass may contain, may vary below the limit value in accordance with the sulphur content of the gases to be purified and the capacity of the purification chambers. It is however advisable to proportion the weight of the metal and of the inert material in the purifying mass so as to let the metal retain the maximum limit weight of 10% of the weight of the sulphur retainable.

The weight limit of sulphur to be retained by the purifying agent may be slightly increased if recourse is had to additional means for depressing the temperature of the reaction, for example by employing one or the other of the artifices proposed in my United States patent application Serial No. 296,288 filed July 30th, 1928, and in French Patent No. 654,242 filed October 6th, 1927.

Claims:

1. A desulphurizing agent for the purification of gases comprising a carrier of inert material impregnated with a metallic purifying substance, the weight of said carrier and metallic substance being proportioned so that the weight of sulphur retainable is not more than 10% of the total weight of the carrier and metallic substance.

2. A desulphurizing agent for the purification of gases comprising a carrier of inert material impregnated with a purifying substance containing nickel, the weight of said carrier and of the nickel being proportioned so that the weight of sulphur retainable is not more than 10% of the total weight of the carrier and purifying substance.

3. A desulphurizing agent for the purification of gases comprising a carrier of inert material impregnated with nickel oxide, the amount of nickel being 20% by weight of said desulphurizing agent.

In testimony whereof I have signed this specification.

ALFRED JOSEPH.